(12) United States Patent
Laprade et al.

(10) Patent No.: US 8,932,706 B2
(45) Date of Patent: Jan. 13, 2015

(54) LAMINATE WITH A HEAT-ACTIVATABLE EXPANDABLE LAYER

(75) Inventors: Jean-Paul Laprade, North Smithfield, RI (US); Philip J. Albenice, Brunswick, GA (US); Jean Donatelli, Cincinnati, OH (US); John W. Geurtsen, Holliston, MA (US)

(73) Assignee: Multi-Color Corporation, Batavia, OH (US)

( * ) Notice: Subject to any disclaimer, the term of this patent is extended or adjusted under 35 U.S.C. 154(b) by 1246 days.

(21) Appl. No.: 11/260,528

(22) Filed: Oct. 27, 2005

(65) Prior Publication Data

US 2007/0098962 A1    May 3, 2007

(51) Int. Cl.
| | |
|---|---|
| *B32B 7/12* | (2006.01) |
| *B32B 3/26* | (2006.01) |
| *B41M 5/00* | (2006.01) |
| *B32B 3/00* | (2006.01) |
| *G09F 3/04* | (2006.01) |
| *B32B 5/20* | (2006.01) |

(52) U.S. Cl.
CPC . *G09F 3/04* (2013.01); *B32B 3/263* (2013.01); *B32B 5/20* (2013.01)
USPC .............. 428/323; 428/402.2; 428/195.1; 428/32.82; 428/32.69; 428/32.87; 428/141

(58) Field of Classification Search
USPC .............. 428/34.1, 40.1, 195.1, 304.4, 313.3, 428/313.5, 317.1, 323; 521/59, 61
See application file for complete search history.

(56) References Cited

U.S. PATENT DOCUMENTS

| | | | |
|---|---|---|---|
| 2,223,017 A | 11/1940 | Abrams et al. |
| 2,862,832 A | 12/1958 | Shepherd, Jr. |
| 2,989,413 A | 6/1961 | Shepherd, Jr. |
| 2,990,311 A | 6/1961 | Shepherd, Jr. |
| 3,023,554 A | 3/1962 | Hlavacek et al. |
| 3,043,732 A | 7/1962 | Shepherd, Jr. |
| 3,400,810 A | 9/1968 | Makowski |
| 3,401,475 A | 9/1968 | Morehouse et al. |

(Continued)

FOREIGN PATENT DOCUMENTS

| | | |
|---|---|---|
| AU | 514945 B2 | 3/1981 |
| EP | 0209879 A2 | 1/1987 |

(Continued)

OTHER PUBLICATIONS

Wypych, George. Handbook of Antiblocking, Release, and Slip Additives, 2.2.2.3 "Polymeric Waxes", ChemTec Publishing, 2005.*

(Continued)

*Primary Examiner* — Prashant J Khatri
(74) *Attorney, Agent, or Firm* — Wood, Herron & Evans, L.L.P.

(57) ABSTRACT

A laminate including a plurality of layers, wherein one of the layers is a heat-activatable expandable layer including a thermally expandable composition. The heat-activatable expandable layer includes a plurality of microcapsules containing the thermally expandable composition. This thermally expandable composition includes an easily volatilizable hydrocarbon, and a binder resin. When subjected to high temperatures during the process of applying a label, the microcapsules rupture and the thermally expandable composition "foams," which can be used to provide a texture to the label, and can raise or surround the graphics of the label.

32 Claims, 2 Drawing Sheets

(56) References Cited

U.S. PATENT DOCUMENTS

| | | | |
|---|---|---|---|
| 3,516,842 A * | 6/1970 | Klinker, Jr. et al. | 428/40.5 |
| 3,615,972 A * | 10/1971 | Morehouse et al. | 156/79 |
| 3,637,458 A | 1/1972 | Parrish | |
| 3,645,768 A | 2/1972 | Coco et al. | |
| 3,787,543 A | 1/1974 | Parrish | |
| 3,813,801 A | 6/1974 | Vander Schaaf | |
| 3,971,852 A | 7/1976 | Brenner et al. | |
| 4,264,657 A | 4/1981 | Tollette | |
| 4,268,567 A | 5/1981 | Harmony | |
| 4,268,615 A | 5/1981 | Yonezawa | |
| 4,273,816 A | 6/1981 | Tollette | |
| 4,315,573 A | 2/1982 | Bradley et al. | |
| 4,339,551 A | 7/1982 | Heider | |
| 4,362,778 A * | 12/1982 | Andersson et al. | 442/221 |
| 4,435,344 A | 3/1984 | Iioka | |
| 4,482,414 A | 11/1984 | Schonberger | |
| 4,486,366 A | 12/1984 | Reddy | |
| 4,492,725 A | 1/1985 | Ishihara et al. | |
| 4,536,434 A | 8/1985 | Magnotta | |
| 4,567,681 A | 2/1986 | Fumei | |
| 4,581,262 A | 4/1986 | Karabedian | |
| 4,581,266 A | 4/1986 | Magnotta | |
| 4,585,679 A | 4/1986 | Karabedian | |
| 4,612,721 A | 9/1986 | Fumei | |
| 4,626,455 A | 12/1986 | Karabedian | |
| 4,662,965 A | 5/1987 | DiFrank et al. | |
| 4,665,107 A | 5/1987 | Micale | |
| 4,713,269 A | 12/1987 | Jabarin et al. | |
| 4,713,270 A | 12/1987 | Jabarin et al. | |
| 4,719,143 A | 1/1988 | Jabarin | |
| 4,740,529 A | 4/1988 | Taka et al. | |
| 4,746,028 A | 5/1988 | Bagg | |
| 4,759,454 A | 7/1988 | Nowicki et al. | |
| 4,769,264 A | 9/1988 | Dreger | |
| 4,784,714 A | 11/1988 | Shibata | |
| 4,786,342 A | 11/1988 | Zellner et al. | |
| 4,786,353 A | 11/1988 | Templeton et al. | |
| 4,795,513 A | 1/1989 | Jensen, Jr. | |
| 4,821,874 A | 4/1989 | Uhlig | |
| 4,830,895 A | 5/1989 | Bernard | |
| 4,832,495 A | 5/1989 | Briggs et al. | |
| 4,832,774 A | 5/1989 | DiFrank et al. | |
| 4,839,332 A | 6/1989 | Ikeda et al. | |
| 4,857,501 A | 8/1989 | Usami et al. | |
| 4,871,579 A | 10/1989 | Bravet et al. | |
| 4,871,597 A | 10/1989 | Hobson | |
| 4,879,362 A | 11/1989 | Morgan | |
| 4,886,183 A | 12/1989 | Fleming | |
| 4,898,633 A | 2/1990 | Doree et al. | |
| 4,898,848 A | 2/1990 | Shibata | |
| 4,904,324 A | 2/1990 | Heider | |
| 4,906,503 A | 3/1990 | De La Cruz et al. | |
| 4,935,300 A | 6/1990 | Parker et al. | |
| 4,937,167 A | 6/1990 | Moffat et al. | |
| 4,967,537 A | 11/1990 | Moore | |
| 4,973,566 A | 11/1990 | Readey et al. | |
| 4,975,313 A | 12/1990 | Ezawa et al. | |
| 4,983,238 A | 1/1991 | Yoshida et al. | |
| 5,023,112 A | 6/1991 | Schultz | |
| 5,042,661 A | 8/1991 | Moore | |
| 5,043,130 A | 8/1991 | Fujio | |
| 5,067,612 A | 11/1991 | Tsuchiya et al. | |
| 5,078,817 A | 1/1992 | Takagaki | |
| 5,079,057 A | 1/1992 | Heider | |
| 5,082,608 A | 1/1992 | Karabedian et al. | |
| 5,147,067 A | 9/1992 | Effertz | |
| 5,151,403 A | 9/1992 | Suzuki et al. | |
| 5,163,608 A | 11/1992 | Block | |
| 5,168,989 A | 12/1992 | Benno | |
| 5,170,905 A | 12/1992 | Luch | |
| 5,188,775 A | 2/1993 | Hornback et al. | |
| 5,206,054 A | 4/1993 | Schultz | |
| 5,209,998 A | 5/1993 | Kavassalis et al. | |
| 5,217,307 A | 6/1993 | McClintock | |
| 5,248,555 A | 9/1993 | Matsushita et al. | |
| 5,253,780 A | 10/1993 | Adado | |
| 5,256,131 A | 10/1993 | Owens et al. | |
| 5,259,529 A | 11/1993 | Coale | |
| 5,277,733 A | 1/1994 | Effertz | |
| 5,286,703 A | 2/1994 | Wachi et al. | |
| 5,313,809 A | 5/1994 | Isaacson et al. | |
| 5,325,781 A * | 7/1994 | Dupont et al. | 101/487 |
| 5,360,826 A * | 11/1994 | Egolf et al. | 521/54 |
| 5,391,420 A | 2/1995 | Bootman et al. | |
| 5,405,667 A | 4/1995 | Heider | |
| 5,441,810 A * | 8/1995 | Aizawa et al. | 428/354 |
| 5,443,769 A | 8/1995 | Karabedian et al. | |
| 5,447,902 A | 9/1995 | Imai et al. | |
| 5,452,802 A | 9/1995 | Green | |
| 5,457,080 A | 10/1995 | Takano et al. | |
| 5,469,983 A | 11/1995 | Yawata | |
| 5,471,822 A | 12/1995 | Dugan et al. | |
| 5,489,360 A | 2/1996 | Shimizu et al. | |
| 5,502,097 A | 3/1996 | Saito | |
| 5,508,247 A | 4/1996 | Tran et al. | |
| 5,567,511 A | 10/1996 | Shih et al. | |
| 5,578,412 A | 11/1996 | Held et al. | |
| 5,593,610 A | 1/1997 | Minerich et al. | |
| 5,599,881 A | 2/1997 | Xie | |
| 5,605,230 A | 2/1997 | Marino, Jr. et al. | |
| 5,607,999 A | 3/1997 | Shimizu et al. | |
| 5,628,453 A | 5/1997 | MacLaughlin | |
| 5,641,084 A | 6/1997 | Rice | |
| 5,650,217 A * | 7/1997 | Skrivanek et al. | 428/195.1 |
| 5,665,443 A | 9/1997 | Hata et al. | |
| 5,674,602 A | 10/1997 | Karabedian et al. | |
| 5,677,049 A * | 10/1997 | Torii | 428/32.73 |
| 5,713,512 A | 2/1998 | Barrett | |
| 5,714,028 A | 2/1998 | Horai et al. | |
| 5,725,966 A | 3/1998 | Abe et al. | |
| 5,741,381 A | 4/1998 | Dolence et al. | |
| 5,759,337 A | 6/1998 | Fujio et al. | |
| 5,769,226 A | 6/1998 | Arai | |
| 5,773,386 A | 6/1998 | Langan | |
| 5,775,577 A | 7/1998 | Titus | |
| 5,798,202 A | 8/1998 | Cushner et al. | |
| 5,798,315 A | 8/1998 | Etoh et al. | |
| 5,803,287 A | 9/1998 | Kusz | |
| 5,804,353 A | 9/1998 | Cushner et al. | |
| 5,813,540 A | 9/1998 | Vollbrecht et al. | |
| 5,843,362 A | 12/1998 | Yoshii et al. | |
| 5,846,622 A * | 12/1998 | Imaeda | 428/40.1 |
| 5,846,642 A | 12/1998 | Kimura et al. | |
| 5,856,432 A | 1/1999 | Auman et al. | |
| 5,857,778 A | 1/1999 | Ells | |
| 5,861,201 A | 1/1999 | Blackwelder et al. | |
| 5,863,641 A | 1/1999 | Sakamoto et al. | |
| 5,874,171 A | 2/1999 | Wagner | |
| 5,922,164 A | 7/1999 | Kimura et al. | |
| 5,925,450 A | 7/1999 | Karabedian et al. | |
| 5,961,872 A | 10/1999 | Simon et al. | |
| 5,968,303 A | 10/1999 | Nagasaka | |
| 5,994,028 A | 11/1999 | Lee | |
| 5,998,082 A | 12/1999 | Jimbo et al. | |
| 6,011,115 A | 1/2000 | Miharu et al. | |
| 6,022,912 A | 2/2000 | Spitler et al. | |
| 6,030,135 A | 2/2000 | Imai | |
| 6,042,676 A | 3/2000 | Stein | |
| 6,143,819 A | 11/2000 | Nakanishi | |
| 6,150,013 A | 11/2000 | Balaji et al. | |
| 6,153,042 A | 11/2000 | Tominaga | |
| 6,155,025 A | 12/2000 | Komiya et al. | |
| 6,172,002 B1 | 1/2001 | Saito et al. | |
| 6,191,208 B1 | 2/2001 | Takahashi | |
| 6,224,954 B1 | 5/2001 | Mitchell et al. | |
| 6,240,716 B1 | 6/2001 | Yanagawase et al. | |
| 6,262,221 B1 | 7/2001 | Palmer | |
| 6,267,837 B1 | 7/2001 | Mitchell et al. | |
| 6,270,888 B1 | 8/2001 | Rutter et al. | |
| 6,281,296 B1 | 8/2001 | MacLachlan et al. | |
| 6,296,129 B1 | 10/2001 | Kawasaki | |
| 6,309,498 B1 | 10/2001 | Doi | |
| 6,326,071 B1 | 12/2001 | Francoeur | |
| 6,328,557 B1 | 12/2001 | Grishchenko et al. | |

(56) References Cited

U.S. PATENT DOCUMENTS

| | | | |
|---|---|---|---|
| 6,352,769 B1 * | 3/2002 | Mori | 428/354 |
| 6,352,785 B1 | 3/2002 | Hanada et al. | |
| 6,355,307 B1 | 3/2002 | Brenke et al. | |
| 6,376,071 B1 | 4/2002 | Tanaka et al. | |
| 6,383,922 B1 | 5/2002 | Zhang et al. | |
| 6,406,653 B1 | 6/2002 | Blackwelder et al. | |
| 6,406,765 B1 | 6/2002 | Braun et al. | |
| 6,407,034 B1 | 6/2002 | Ewing | |
| 6,416,833 B1 | 7/2002 | Climenhage et al. | |
| 6,417,379 B1 | 7/2002 | Hung | |
| 6,436,219 B1 | 8/2002 | Francis et al. | |
| 6,437,066 B1 | 8/2002 | Hung et al. | |
| 6,448,200 B1 | 9/2002 | Suzuki | |
| 6,455,638 B2 | 9/2002 | Laughner et al. | |
| 6,465,107 B1 | 10/2002 | Kelly | |
| 6,476,134 B1 | 11/2002 | Bolz et al. | |
| 6,521,708 B2 | 2/2003 | Lee et al. | |
| 6,537,657 B1 | 3/2003 | Watanabe et al. | |
| 6,548,148 B1 | 4/2003 | Torii et al. | |
| 6,548,179 B2 | 4/2003 | Uhara et al. | |
| 6,548,572 B1 | 4/2003 | Breck et al. | |
| 6,586,075 B1 | 7/2003 | Mitchell et al. | |
| 6,586,364 B2 | 7/2003 | Kubota et al. | |
| 6,586,546 B2 | 7/2003 | Iwasaki et al. | |
| 6,589,463 B1 | 7/2003 | Vogt et al. | |
| 6,620,281 B1 | 9/2003 | Sommers | |
| 6,632,879 B2 | 10/2003 | Brann et al. | |
| 6,638,465 B1 | 10/2003 | Andreis-Olinger et al. | |
| 6,638,999 B2 | 10/2003 | Bish et al. | |
| 6,646,077 B1 | 11/2003 | Lyons | |
| 6,649,699 B2 | 11/2003 | Namura | |
| 6,673,416 B1 | 1/2004 | Nishio | |
| 6,701,720 B1 | 3/2004 | Stone et al. | |
| 6,720,065 B1 | 4/2004 | Cosentino | |
| 6,720,383 B2 | 4/2004 | Barclay et al. | |
| 6,720,403 B1 | 4/2004 | Houser | |
| 6,737,540 B2 | 5/2004 | Ionkin | |
| 6,740,373 B1 | 5/2004 | Swoboda et al. | |
| 6,743,520 B2 | 6/2004 | Street et al. | |
| 6,755,350 B2 | 6/2004 | Rochford et al. | |
| 6,780,507 B2 | 8/2004 | Toreki et al. | |
| 6,783,902 B2 | 8/2004 | Szajewski et al. | |
| 6,808,770 B2 | 10/2004 | Nozawa et al. | |
| 6,819,348 B2 | 11/2004 | Tamura et al. | |
| 6,830,808 B2 | 12/2004 | Iwamoto et al. | |
| 6,835,269 B1 | 12/2004 | Miharu et al. | |
| 6,852,381 B2 | 2/2005 | Debraal et al. | |
| 6,855,400 B1 | 2/2005 | Andreis et al. | |
| 6,875,820 B2 | 4/2005 | Berard et al. | |
| 6,887,541 B2 | 5/2005 | Benim et al. | |
| 6,894,134 B2 | 5/2005 | Brookhart et al. | |
| 6,903,176 B2 | 6/2005 | Cameron | |
| 6,908,685 B2 | 6/2005 | Uhara et al. | |
| 6,908,686 B2 | 6/2005 | Olek et al. | |
| 6,916,544 B2 | 7/2005 | Moriyama et al. | |
| 6,919,111 B2 | 7/2005 | Swoboda et al. | |
| 6,925,816 B2 | 8/2005 | Anderson et al. | |
| 6,926,945 B2 | 8/2005 | Yano et al. | |
| 6,956,010 B2 | 10/2005 | Tsukida et al. | |
| 7,004,161 B2 | 2/2006 | Kolb | |
| 7,070,841 B2 | 7/2006 | Benim et al. | |
| 7,081,286 B2 | 7/2006 | Benim et al. | |
| 7,108,906 B2 | 9/2006 | Benim et al. | |
| 7,117,684 B2 | 10/2006 | Scudder et al. | |
| 7,175,730 B2 | 2/2007 | Benim et al. | |
| 2001/0050287 A1 | 12/2001 | Namba et al. | |
| 2002/0150735 A1 | 10/2002 | Nozawa et al. | |
| 2002/0177005 A1 | 11/2002 | Yamashita | |
| 2003/0003251 A1 | 1/2003 | DeBraal et al. | |
| 2003/0003276 A1 | 1/2003 | Mizuhara et al. | |
| 2003/0021918 A1 | 1/2003 | McKillip | |
| 2003/0021921 A1 | 1/2003 | Debraal et al. | |
| 2003/0041853 A1 | 3/2003 | Kolb | |
| 2003/0068453 A1 | 4/2003 | Kong | |
| 2003/0124258 A1 | 7/2003 | Benim et al. | |
| 2003/0129335 A1 | 7/2003 | Benim et al. | |
| 2003/0161925 A1 | 8/2003 | Scullion et al. | |
| 2003/0186605 A1 | 10/2003 | Mitchell et al. | |
| 2003/0186808 A1 | 10/2003 | Ueki et al. | |
| 2003/0203818 A1 | 10/2003 | Mitchell | |
| 2003/0207059 A1 | 11/2003 | Benim et al. | |
| 2004/0011802 A1 | 1/2004 | Findlay et al. | |
| 2004/0018322 A1 | 1/2004 | Doi | |
| 2004/0037980 A1 | 2/2004 | DeBraal | |
| 2004/0038020 A1 * | 2/2004 | Murata et al. | 428/317.1 |
| 2004/0040260 A1 | 3/2004 | Besford | |
| 2004/0045205 A1 | 3/2004 | Witham et al. | |
| 2004/0045206 A1 | 3/2004 | Witham | |
| 2004/0097157 A1 | 5/2004 | Cosentino | |
| 2004/0101675 A1 * | 5/2004 | Kauffman et al. | 428/319.3 |
| 2004/0115466 A1 | 6/2004 | Ogawa et al. | |
| 2004/0126607 A1 | 7/2004 | Suzuki | |
| 2004/0129004 A1 | 7/2004 | Anderson et al. | |
| 2004/0209023 A1 | 10/2004 | Swoboda et al. | |
| 2004/0265539 A1 | 12/2004 | Hashimoto et al. | |
| 2005/0003122 A1 | 1/2005 | Debraal et al. | |
| 2005/0027049 A1 | 2/2005 | Sun et al. | |
| 2005/0035081 A1 | 2/2005 | Fitch | |
| 2005/0058790 A1 | 3/2005 | Simon et al. | |
| 2005/0112305 A1 | 5/2005 | Swoboda et al. | |
| 2005/0140769 A1 | 6/2005 | Kanemaru et al. | |
| 2005/0142268 A1 | 6/2005 | Scullion et al. | |
| 2005/0142269 A1 | 6/2005 | Scullion et al. | |
| 2005/0147795 A1 | 7/2005 | Kobayashi et al. | |
| 2005/0193744 A1 | 9/2005 | Cockings et al. | |
| 2005/0198969 A1 | 9/2005 | Scudder et al. | |
| 2005/0208245 A1 | 9/2005 | Farha | |
| 2005/0220939 A1 | 10/2005 | Morrow | |
| 2005/0236428 A1 | 10/2005 | Quigley et al. | |
| 2005/0236468 A1 | 10/2005 | Sadlier | |
| 2005/0279106 A1 | 12/2005 | Leonzo et al. | |
| 2006/0019071 A1 | 1/2006 | Akita | |
| 2006/0057365 A1 | 3/2006 | Swoboda et al. | |
| 2006/0091143 A1 | 5/2006 | Chantalat | |
| 2006/0118552 A1 | 6/2006 | Tiefenback | |
| 2006/0144915 A1 | 7/2006 | Sadlier | |
| 2006/0162344 A1 | 7/2006 | Scudder et al. | |
| 2006/0189030 A1 | 8/2006 | Chambers et al. | |
| 2006/0222793 A1 | 10/2006 | Kashimura et al. | |
| 2007/0026175 A1 | 2/2007 | Toya et al. | |
| 2007/0087144 A1 | 4/2007 | Albenice et al. | |
| 2007/0098962 A1 | 5/2007 | Laprade | |
| 2007/0240806 A1 | 10/2007 | Suzuki et al. | |

FOREIGN PATENT DOCUMENTS

| | | |
|---|---|---|
| EP | 0408016 A1 | 1/1991 |
| EP | 0744448 A2 | 11/1996 |
| EP | 1262229 A1 | 12/2002 |
| EP | 1262414 A2 | 12/2002 |
| GB | 2051723 A | 1/1981 |
| GB | 2142900 A | 1/1985 |
| JP | 52076765 | 6/1977 |
| JP | 59145220 | 8/1984 |
| JP | 59176335 | 10/1984 |
| JP | 59230720 | 12/1984 |
| JP | 60130627 | 7/1985 |
| JP | 60232928 | 11/1985 |
| JP | 61219628 | 9/1986 |
| JP | 62204927 | 9/1987 |
| JP | 63281958 | 11/1988 |
| JP | 63317445 | 12/1988 |
| JP | 1084876 A | 3/1989 |
| JP | 1199853 A | 8/1989 |
| JP | 1267159 A | 10/1989 |
| JP | 02-277624 A * | 11/1990 |
| JP | 2269683 | 11/1990 |
| JP | 4033818 | 2/1992 |
| JP | 4041233 | 2/1992 |
| JP | 4044976 | 2/1992 |
| JP | 6023890 | 2/1994 |
| JP | 6337635 | 12/1994 |
| JP | 7149332 | 6/1995 |
| JP | 7271299 | 10/1995 |

(56) References Cited

FOREIGN PATENT DOCUMENTS

| | | | | |
|---|---|---|---|---|
| JP | 8054828 | 2/1996 | | |
| JP | 8076690 | 3/1996 | | |
| JP | 8106252 | 4/1996 | | |
| JP | 10105064 A | 4/1998 | | |
| JP | 10337796 A | 12/1998 | | |
| JP | 11255244 A | 9/1999 | | |
| JP | 2000007806 A | 1/2000 | | |
| JP | 2000025852 A | 1/2000 | | |
| JP | 2000043843 A | 2/2000 | | |
| JP | 2000229677 A | 8/2000 | | |
| JP | 2001055277 A | 2/2001 | | |
| JP | 2001055280 A | 2/2001 | | |
| JP | 2001072145 A | 3/2001 | | |
| JP | 2001125489 A | 5/2001 | | |
| JP | 2001175179 A | 6/2001 | | |
| JP | 2001236019 A | 8/2001 | | |
| JP | 2001294282 A | 10/2001 | | |
| JP | 2003022017 A | * | 1/2003 | ................ G09F 3/04 |
| JP | 2003022018 A | 1/2003 | | |
| JP | 2003029638 A | 1/2003 | | |
| JP | 2003034369 | 2/2003 | | |
| JP | 2000089678 A | 3/2003 | | |
| JP | 2003081267 | 3/2003 | | |
| JP | 2003155068 A | 5/2003 | | |
| JP | 2003175964 | 6/2003 | | |
| JP | 2003186403 | 7/2003 | | |
| JP | 2003246354 | 9/2003 | | |
| JP | 2004001849 | 1/2004 | | |
| JP | 2004009670 | 1/2004 | | |
| JP | 2004035025 | 2/2004 | | |
| JP | 2004067189 | 3/2004 | | |
| JP | 2004070077 | 3/2004 | | |
| JP | 2004106857 | 4/2004 | | |
| JP | 2004117629 | 4/2004 | | |
| JP | 2004142785 | 5/2004 | | |
| JP | 2004163813 | 6/2004 | | |
| JP | 2004205768 | 7/2004 | | |
| JP | 2004226468 | 8/2004 | | |
| JP | 2004240282 | 8/2004 | | |
| JP | 2004252291 A | * | 9/2004 | ................ G09F 3/02 |
| JP | 2004291617 | 10/2004 | | |
| JP | 2004298605 | 10/2004 | | |
| JP | 2004302125 | 10/2004 | | |
| JP | 2004532751 A | 10/2004 | | |
| JP | 2004325988 | 11/2004 | | |
| JP | 2005004017 | 1/2005 | | |
| JP | 2005035120 | 2/2005 | | |
| JP | 2005047528 | 2/2005 | | |
| JP | 2005055490 | 3/2005 | | |
| JP | 2005059946 | 3/2005 | | |
| JP | 2005062701 | 3/2005 | | |
| JP | 2005097771 | 4/2005 | | |
| JP | 2005097772 | 4/2005 | | |
| JP | 2005111970 | 4/2005 | | |
| JP | 2005119732 | 5/2005 | | |
| JP | 2005119733 | 5/2005 | | |
| JP | 2005119734 | 5/2005 | | |
| JP | 2005153887 | 6/2005 | | |
| JP | 2005173167 | 6/2005 | | |
| JP | 2005196151 | 7/2005 | | |
| JP | 2005215512 | 8/2005 | | |
| JP | 2005266592 | 9/2005 | | |
| JP | 2005292461 | 10/2005 | | |
| JP | 2005338304 | 12/2005 | | |
| JP | 2006030668 | 2/2006 | | |
| JP | 2006077883 | 3/2006 | | |
| JP | 2006213341 A | 8/2006 | | |
| WO | 9323971 A1 | 11/1993 | | |
| WO | 9508661 A1 | 3/1995 | | |
| WO | 9725196 A1 | 7/1997 | | |
| WO | 9732797 A1 | 9/1997 | | |
| WO | 02084630 A1 | 10/2002 | | |
| WO | 02102682 A1 | 12/2002 | | |
| WO | 03036186 A1 | 5/2003 | | |
| WO | 2005048218 A1 | 5/2005 | | |
| WO | 2005105904 A1 | 11/2005 | | |
| WO | 2006086333 A1 | 8/2006 | | |
| WO | 2007022463 A2 | 2/2007 | | |

OTHER PUBLICATIONS

Fink, Johannes Karl. Reactive Polymers Fundamentals and Applications—A Concise Guide to Industrial Polymers, 20.2 Toner Resins, pp. 694-695, William Andrew Publishing, 2005.*
English abstract for JP 02-277624. Published Nov. 14, 1990, Retrieved Apr. 7, 2011.*
Machine translation of JP2004-252291. Retrieved Jul. 15, 2013.*
Machine Translation of JP2003-022017. Retrieved Jun. 3, 2014.*
International Search Report, PCT/US2006/040514, 2 pgs.
Merriam-Webster's Collegiate Dictionary, Tenth Ed., 1999, p. 1103.
Office Action dated Apr. 15, 2011 in corresponding U.S. Appl. No. 11/358,546.
International Preliminary Report on Patentability in PCT/US2007/079173 dated Mar. 31, 2009.
International Search Report and Written Opinion in PCT/US2007/079173 dated Mar. 26, 2008.
Office Action dated Feb. 27, 2012 in Japanese Patent Application No. 2009-530558.
Office Action dated Nov. 17, 2010 in Canadian Patent Application No. 2,664,408.
Office Action dated Oct. 4, 2013 in European Patent Application No. 07842975.0.
Office Action dated Sep. 5, 2011 in Japanese Patent Application No. 2009-530558.
Supplementary European Search Report dated Jan. 21, 2013 in European Patent Application No. 07842975.0.
Office Action dated Aug. 30, 2013 in corresponding U.S. Appl. No. 11/358,546.
Office Action dated Jan. 17, 2013 in corresponding U.S. Appl. No. 11/358,546.
Office Action dated Jan. 9, 2013 in corresponding U.S. Appl. No. 12/035,116.
Office Action dated Mar. 28, 2012 in corresponding U.S. Appl. No. 11/358,546.
Office Action dated Mar. 6, 2012 in corresponding U.S. Appl. No. 12/035,116.
Office Action dated Nov. 14, 2013 in corresponding U.S. Appl. No. 11/358,546.
Office Action dated Nov. 26, 2013 in corresponding U.S. Appl. No. 12/035,116.
Office Action dated Nov. 7, 2011 in corresponding U.S. Appl. No. 11/358,546.
Office Action dated Sep. 11, 2012 in corresponding U.S. Appl. No. 11/358,546.
Surya Textech; www.suryatextech.com via Internet Wayback Machine, Jan. 16, 2008.

* cited by examiner

LAMINATE WITH A HEAT-ACTIVATABLE EXPANDABLE LAYER

FIELD OF INVENTION

The present invention relates generally to laminates, and particularly to laminates used to provide labels and other decorations, such as heat-transferable labels and shrink sleeve labels.

BACKGROUND OF THE INVENTION

Decoration of products, through labeling for example, is an important aspect to the marketing of a product—it provides not only a description of the product but also provides aesthetic qualities to entice purchasing. Labels used to decorate articles include heat transferable labels and shrink sleeve labels. Heat transferable labels are multi-layered laminates, with each layer having its own function. For example, heat transferable labels generally include an adhesive layer, an ink layer, and a wax release layer. The wax release layer is often directly adjacent a carrier sheet, such as on a roll or web of labels. When subjected to heat, the wax release layer melts, thereby allowing the laminate to be separated for the carrier sheet, and the adhesive layer adheres the ink layer to an article being labeled. The wax release layer may provide protection to the ink layer. Additionally or alternatively, the labels may include a separate protective layer overlying the ink layer to protect the ink layer from abrasion.

In the heat transfer process, articles, such as containers made of plastic and glass, are put in contact with an image of the ink layer, which becomes part of the container. The image is preprinted in reverse, such as by using rotogravure printing technologies on a continuous paper web with a special release agent, for example. The web is passed over a preheater (200° to 300° F.) then a transfer plate (300° to 500° F.) that heats the web to soften the release agent (i.e., the wax) and activates the adhesive. A heated rubber transfer roller causes the activated adhesive to come in contact with the article being labeled. The heated roller maintains web-to-article contact throughout the label application and thus transfers the laminate, including the ink layer image. Preheating or preflaming may be necessary to prepare the container surface to allow for a permanent bond. After label application, postcuring or postflaming may also be necessary depending on container material.

Shrink films, such as shrink sleeves and shrink wraps, are also often used in decoration, such as labeling of articles. The use of these films involves sizing a shrink film, which may be a tubular shrink sleeve for flat shrink wrap, to an article, and snugly enclosing the shrink film around the article by shrinking the film. This shrinking process is accomplished by the application of heat to the shrink film. The shrink film may generally be formed from polyethylene terephthalate, polyethylene terephthalate glycol, polyvinyl chloride, or oriented polystyrene, for example. This film has an inherent tension, which is released by heating the film from the outside in a shrink oven.

Labels, such as the heat-transferable and shrink sleeve labels described above, are commonly used to decorate and/or to label commercial articles, such as, and without limitation, containers for beverages (including alcoholic beverages, such as beer), essential oils, detergents, adverse chemicals, as well as health and beauty aids. Heat-transferable labels are desirably resistant to abrasion and chemical effects in order to avoid a loss of label information and desirably possess good adhesion to the articles to which they are affixed. However, several drawbacks are associated with current heat transferable labels, as well as with shrink sleeve labels and other types of labels.

For example, heat transferable labels include a gloss or sheen. This gloss is generally attributable to the protective layer. The high gloss or sheen of the heat transferable label often may be a desirable aesthetic quality. However, in the case where an article is "textured" (i.e., does not have a high gloss surface), a high gloss label can result in an unaesthetic contrast with the textured article.

Further, the high gloss of the label more specifically is an effect of the smooth surface of the protective layer. This smooth surface imparts a slippery quality to the label that does not allow for a comfortable or solid grip of an article to which it is applied. The slippery nature of such labels can lead to an increase in the number of articles and labels that are damaged due to dropping of the article, etc. This leads to increased costs of the article. This problem is prevalent not only in heat-transferable labels, but also with other smooth and glossy labels, such as a shrink sleeve label.

Further still, heat-transferable labels and shrink sleeve labels do not have any thermal barrier properties. Often, articles being labeled are containers designed to hold other substances. These substances may be hot when placed in the container, or can subsequently be made hot (for example, soup in a microwaveable container). In the absence of any thermal barrier, the heat of the contents can be transferred through the container and label. When the article is then grasped, the heat can cause injury. These drawbacks may be found in labels other than heat-transferable labels and shrink sleeve labels, including, but not limited to, in-mold labels.

In view of the above, it would be desirable to provide a label that would allow both quality printing of graphical information, and also provide a tactile feature, which can enhance grip. In doing so, it would be desirable for the tactile feature to generally match that of an article to which the label is applied in order to be aesthetically pleasing. It would be further desirable for such a label to provide thermal barrier properties.

SUMMARY OF THE INVENTION

The present invention overcomes the drawbacks discussed above by providing a laminate including a heat-activatable expandable layer that provides a tactile feature when in a heat-activated, and therefore expanded, state. This tactile feature may be designed to match a surface of an article to which it is applied, and also may enhance grip and provide a thermal barrier.

More specifically, the laminate of the present invention may include a plurality of layers (for example, a wax layer, a protective layer, an ink layer, and a heat-activatable adhesive layer, although all of these layers are not necessary to the present invention). One of the layers is a heat-activatable expandable layer including a thermally expandable composition. The heat-activatable expandable layer may include a plurality of microcapsules containing the thermally expandable composition. This thermally expandable composition may include a "foaming" agent having an easily volatilizable hydrocarbon, and a binder resin. When subjected to high temperatures during the process of applying a label, the microcapsules rupture and the thermally expandable composition "foams," which can be used to provide a texture to the label, and can raise or surround the graphics (i.e., an ink layer) of the label. Alternatively, the thermally expandable composition can be patterned in such manner that, when activated, the resulting raised texture can itself appear in a pattern or a design, thereby further adding to the aesthetics of the label. The textured label can offer aesthetic benefits by matching the nonglossy texture of container materials along with imparting its own design, and can create a friendly-to-the-touch type of label. Thus, the textured surface of the laminate, due to the thermally expandable layer, provides a more comfortable and enhanced grip to the user.

Further, the thermally expandable composition can impart a thermal barrier property to the label. Thus, the raised textured surface creates increased resistance to heat loss, providing a thermal barrier should any heated materials be placed within the container, or should any materials within the container be subsequently heated.

Furthermore, since the expandable layer is heat-activated, it will be recognized that the textured attributes of the label are induced by heat as opposed to other stimuli (e.g., pressure). Since the use of heat is already an integral part of labeling applications such as heat transfer and shrink sleeve labeling, the labeled article would not have to be subjected to any additional processes. This is advantageous because any additional process steps would decrease label application throughput.

Further embodiments will be apparent to those skilled in the art in accordance with the principles of the invention described below.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION OF THE INVENTION

Referring to the figures, the present invention provides a laminate 10 including a heat-activatable expandable layer 12. The laminate 10 is depicted as including layers other than the heat-activatable expandable layer 12. However, while laminates 10 in accordance with the principles of the present invention may include multiple layers (from two layers to several layers), many of the layers discussed herein are merely exemplary, both in the number, type, and positioning of the layers, and thus are not necessary to certain embodiments of the invention. Thus, in its broadest embodiment, the present invention simply provides a laminate 10 including a heat-activatable expandable layer 12.

Prior to the application of heat, the heat-activatable expandable layer 12 is in a nonactivated, and thus nonexpanded, state. When in a heat-activated state, the heat-activatable expandable layer 12 expands to provide at least a tactile feature to the laminate 10. The application of heat generally may occur during the process of applying the laminate 10 to an article 22, although it may be applied at other times, such as during a post flaming process. The heat-activatable expandable layer 12 may include various materials in order to achieve this expansion, and in a particular embodiment, includes a heat expandable composition including a binder resin and a solvent. The binder resin may be present in a range of about 50% by weight to about 80% by weight of the expandable layer, and the solvent may be present in a range of up to about 20% by weight of the expandable layer.

The solvent, such as water, for example, is used with an emulsifying agent to prepare an emulsion including the binder resin. This emulsifying agent may be a surfactant. In general, the binder resin is fragmentized, by methods well known to those skilled in the art. The fragmentized binder resin is then emulsified using the surfactant and solvent by methods also well known to those skilled in the art. The function of the binder is to impart cohesive film strength and interlayer adhesion within the laminate 10. Upon the application of heat, the expandable composition undergoes an expansive or "foaming" effect. This expansive or "foaming" effect can be disruptive to the other layers of the laminate 10. Thus, the binder resin is useful to hold any layers adjacent to the expanding layer to one another in order to maintain the integrity of the laminate 10.

Additionally, the heat-expandable composition may also include a colorant. The colorant may be present in a range of about 1% by weight to about 5% by weight of the expandable layer. One function of the colorant may be to match the color of the expandable layer to the article 22 receiving the laminate 10.

The heat expandable composition of the heat-activatable expandable layer 12 may further be disposed on an outer surface of a plurality of microspheres. These microspheres may be present in a range of about 10% by weight to about 50% by weight of the heat-activatable expandable layer 12. The microspheres are held together on a film due to the binder resin of the expandable composition on the outer surface of the microspheres. The microspheres are designed to rupture to allow expansion of the heat expandable composition upon the occurrence of a particular event, such as heating to a particular temperature. In order to rupture, the microspheres may be constructed from an easily volatilizable hydrocarbon. In a particular embodiment, the microspheres may be FOAMCOAT A7810 AY™ microspheres, commercially available from Sovereign Specialty Chemical, of Chicago, Illinois. However, as will be recognized by those skilled in the art, the microspheres can be constructed from any material, as long as the microspheres can be adaptable to rupture at the proper moment (such as due to a temperature) to result in expansion of the heat-activatable expandable layer 12. Additionally, the microspheres may include an interior compartment. A gas, such as isobutane, may be microencapsulated in the interior compartment encapsulated by the microspheres. The gas expands on the application of heat, causing the microspheres to rupture and the expandable composition to expand.

Thus, in one particular embodiment, the microspheres may be heat-rupturable. In embodiments wherein the microspheres are heat-rupturable, they may be adapted to rupture at temperatures at or above about 180° F. When subjected to temperatures above about 180° F. during the process of attaching the laminate 10, the microcapsules rupture and the composition "foams," causing the layer to expand. The expandable lacquer is the only layer that foams/expands when heated. In particular, the microcapsules rupture, releasing a gas, such as isobutane, which expands the coating. The material is then held in the expanded state by the binder resin. By using microspheres that are heat-rupturable, the laminate 10 of the present invention is amenable to use in labels that are subjected to heat during the application process, such as heat-transferable labels and shrink sleeve labels. This may eliminate the need for a separate heating step. However, it will be recognized by those skilled in the art that the laminate 10 having a heat-activatable expandable layer 12 of the present invention may be used for other types of labels, such as pressure-sensitive labels.

The binder resin, colorant, and solvent of the heat-activatable expandable layer 12 may be chosen from various materials. For example, the binder resin may be chosen from acrylic binders, vinyl acrylic copolymer binders, vinyl acetate homopolymer binders, styrene acrylic binders, and phenoxy binders. More specifically, the acrylic binder may be selected from, but is not limited to, the following Rhoplex binder resins, commercially available from Rohm and Haas, of Philadelphia, Pa.: B15R, B60a, B85, B88, B959, GL618, GL623, HA12, P554, and SP100. Further, the vinyl acrylic copolymer binder may be selected from, but is not limited to, the following Polyco binder resins, commercially available from Rohm and Haas: 3103NP, 3250, and 6107. Further, the vinyl acetate homopolymer binder may be selected from, but is not limited to, the following Polyco binder resins, commercially available from Rohm and Haas: 2149A and 2152. Further, the styrene acrylic binder may be selected from, but is not limited to, the following binder resins, commercially available from Rohm and Haas: P308, P322, and P376. And finally, the phenoxy binder may be, but is not limited to, InChem PKHW34, commercially available from InChem Corporation, of Rock Creek, S.C.

The colorant may include a nonionic water-based dye. However, it should be recognized that this dye is merely exemplary. Other types of dyes may be suitable for the present invention, such as anionic dyes. In one particular embodiment of the present invention, the colorant may be added to the expanding layer to add "tint" to the textured portions of the laminate 10.

The solvent may be chosen from any substance that is an efficient solvent for the heat-expandable composition, but which also does not cause the microcapsules to rupture. Thus, the solvent may be chosen from distilled water and isopropanol, for example.

The term "microencapsulated" or "microencapsulation" is to be taken to mean the packaging by encapsulation of certain liquids or solids in a paste form in an enclosed solid shell. The walls of the microcapsule must be chemically inert to the contents of the capsule and must possess the required stability with respect to the surrounding medium. Further, the capsules must be sealed and must be sufficiently fracture-resistant for the application in question, and also sufficiently temperature stable. The size of the capsules depends on the production process and extends from a diameter of about 2 microns to about a diameter of about 30 microns, however, a size of about 2 to about 20 microns is mostly used. In the microcapsules of the present invention, a substance that may be contained within the capsule is isobutane. The remaining expandable composition (i.e., binder, surfactant, and water emulsion) is coated on the outer surface of the microcapsules. Upon the application of heat, the isobutane causes the microcapsules to burst and also provides the expansive "foaming" characteristic to the expandable composition.

In addition to the heat-activatable expandable layer 12 described above, laminates 10 in accordance with the principles of the present invention may include other layers, as well. Such additional layers may include an adhesive layer 14, a wax release layer 16, an ink layer 18, and/or a protective layer 20.

Referring to the figures, the laminate 10 may include an adhesive layer 14. As shown in the three embodiments of FIGS. 1-3, the adhesive layer 14 is positioned directly adjacent the expandable layer. However, this positioning is merely exemplary, and in alternate embodiments, another layer or layers may be positioned between the heat-activatable expandable layer 12 and the adhesive layer 14. The adhesive layer 14 is adapted to contact and confront an article 22 to which the laminate 10 is applied, to adhere the laminate 10 thereto. Thus, the adhesive layer 14 may include any materials known to those skilled in the art that provide a strong bond to articles 22, such as containers to which labels are applied. Such articles 22 may be made from glass, polyethylene, polypropylene, polyethylene terephthalate, polycarbonate, etc., or a combination of such substances. It will be recognized by those skilled in the art that the listed materials of the article 22 are merely exemplary, and do not constitute an exhaustive list of materials from which such articles 22 are made. Adhesive layer 14 may suitably be composed of a thermoplastic polyamide adhesive. A preferred thermoplastic polyamide adhesive is the reaction product of a diamine with a dimerized fatty acid, such as that available under the trade name VERSAMID 900 series from Henkel Corporation of Minneapolis, Minn. It has been found advantageous to combine this polyamide constituent with a nitrocellulose base in adhesive layer 14.

Figure 1:
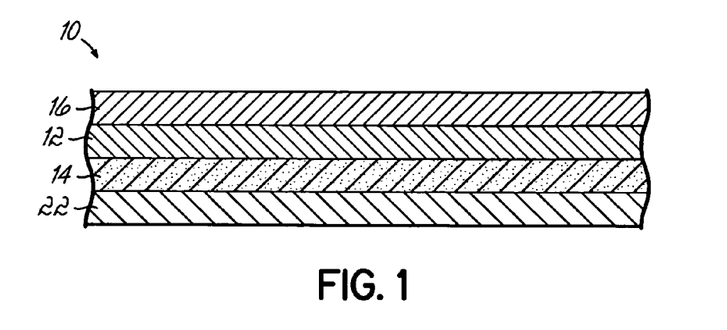
FIG. 1 is a cross-sectional view of a laminate in accordance with the principles of the present invention depicting a continuous heat-activatable expandable layer thereof, along with an adhesive layer and a wax release layer.
Figure 2:
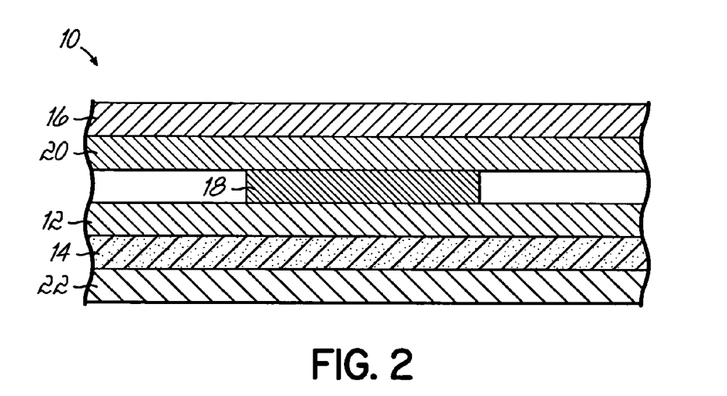
FIG. 2 is a cross-sectional view of a laminate in accordance with the principles of the present invention depicting the heat-activatable expandable layer "underneath" a layer of the laminate.
Figure 3:
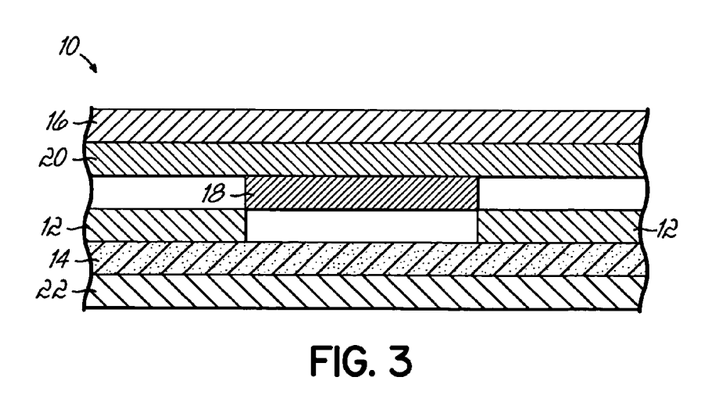
FIG. 3 is a cross-sectional view of a laminate in accordance with the principles of the present invention depicting a heat-activatable expandable layer "surrounding" the ink layer portions of the laminate.

Still referring to FIGS. 1-3, the laminate 10 may further include a wax release layer 16. In one embodiment (as shown in FIG. 1), the heat-activatable expandable layer 12 may be disposed between the adhesive layer 14 and the wax release layer 16. In such a configuration, each of the adhesive layer 14 and the wax release layer 16 is directly adjacent the heat-activatable expandable layer 12. In alternate embodiments (FIGS. 2 and 3), the heat-activatable expandable layer 12 need not be directly adjacent both the adhesive layer 14 and the wax release layer 16.

The wax release layer 16 generally serves two purposes: (1) to provide release of the ink design from a carrier web upon application of heat to the web and (2) in certain embodiments, to form a protective layer 20 over any transferred ink design. Further, after transfer of a heat-transfer label to an article 22, the transferred wax release layer 16 is typically subjected to a post flaming technique, which enhances the optical clarity of the wax release layer 16 (thereby enabling any ink design layer therebeneath to be better observed) and which enhances the protective properties of the transferred wax release layer 16.

The wax release layer 16 may include various materials. Such materials may result in a matte finish or in a gloss finish. For examples of suitable materials for a matte wax release layer 16, see U.S. Pat. No. 4,536,434, the disclosure of which is incorporated by reference herein in its entirety. For examples of suitable materials for a gloss wax release layer 16, see U.S. Pat. No. 4,581,266, the disclosure of which is incorporated by reference herein in its entirety. That patent describes an exemplary formulation for the wax release layer 16 including paraffin and a montan wax, and which may also include a minor amount of microcrystalline wax. In addition to these waxes, the formulation may include a tackifying resin and suitable binder. With proper selection of tackifier resin, the total amount of crystallinity of the paraffin wax can be reduced. This can serve to reduce the amount of "haze" over the final transferred image. Although postflaming serves to reduce some of the hazing which appears over the transferred image it effects only a partial reduction and does not decrease the crystallinity of the wax components. Postflaming has been determined to increase clarity principally because it has the effect of smoothing microscopic hills and valleys on the surface of the transferred release layer. Postflaming thus creates a smoother, more uniform surface of glossy character, increases the overall clarity of the transferred release layer, and consequently the clarity of the transferred design image. Residual amount of opacity or hazing is believed to be caused by the crystalline structure of the solidified paraffin wax, and to a lesser degree, of the solidified microcrystalline wax, which contains crystals of much smaller size.

The paraffin wax component of the formulation for the wax release layer 16 is used to give the wax release layer 16 its principal release characteristic upon melting. Paraffin wax, a petroleum derived product, typically has a molecular weight between about 254 to 450 and is composed essentially of linear saturated hydrocarbons ranging from $C_{18}H_{38}$ to $C_{32}H_{66}$. Paraffins typically have a melting point from about 110° F. to 150° F. ("Melting point," as used herein, refers to drop melting point).

The paraffin wax, a linear saturated hydrocarbon, is characterized in that it crystallizes in both plate and needle-type crystals. Another type of crystalline structure, termed "malcrystalline," is neither plate- nor needle-like, and is observable in the paraffin crystal structure in an amount depending on the boiling point of the paraffin fraction being investigated. In paraffin wax fractions of lower boiling point, for example about 180° F. at 10 mm pressure, the entire crystalline structure is composed of plates. In paraffin wax fractions having somewhat higher boiling points, a minor amount of malcrystalline and needle-like structures may be observable interspersed among the plate-like structures. In general, the plate crystals predominate in paraffin waxes of any boiling range. However, in the higher melting paraffin waxes where there is likely to be some increased amount of branching associated with their structure, there is likely to be a greater portion of malcrystalline and needle-like crystals interspersed among the plates. The type and amount of crystals found in paraffin wax is principally an inherent function of the boiling point range of paraffins being investigated irrespective of the solvent or medium used from which the crystalline solid is precipitated.

Paraffin wax suitable for use in wax release layer 16 is sold in various grades that differ chiefly in melting point. Commercial grades of paraffin wax that may be used in wax release layer 16 are commonly designated as refined, semi refined, and crude grade waxes. Paraffin wax of refined grade is obtainable from a number of sources, one of which is the Petrolite Corporation, Bareco Division, of Tulsa, Okla.

The microcrystalline component of wax release layer 16 may be composed of saturated hydrocarbons of higher melting point than those of paraffin wax. Microcrystalline waxes characteristically contain between about $C_{34}H_{70}$ to $C_{60}H_{120}$ hydrocarbons having molecular weight between about 478 and 840. Microcrystalline waxes (microwaxes) are characterized by an increased amount of branching; although they contain straight chain molecules, they are not as linear a saturated hydrocarbon as paraffin wax. Also compared to paraffin wax, they contain a greater portion of cyclic ring molecules. The crystalline structure of the microcrystalline wax contains predominantly malcrystalline and needle-like crystals having very small, undefined form when compared with the plate-like crystalline structure of paraffin wax under the same magnification. Thus, the crystalline structure of microcrystalline wax is small and irregular when solidified from the melted wax. In solvents, microcrystalline wax discloses no well-formed crystals of any size. Small amounts of microwax may be added to the formulation for wax release layer 16, since microwax imparts a measure of plasticity to the paraffin wax components, since the paraffin wax is rather brittle and would, by itself, tend to cause cracks or fissures in a wax release layer 16. Because of its diminished crystalline structure, microwax contributes little potential hazing or halo effect.

The classes of microwaxes vary principally in their melting point range. For example, the so-called hard microwaxes have a melting point between about 190° F.-210° F.; the plastic microwaxes a melting point between about 145° F.-175° F.; the emulsifiable crystalline waxes between about 190° F.-225° F.; and modified microwaxes between about 165° F.-220° F. All of these various types of microwaxes may be employed in the present formulation. An illustrative, commercially available microcrystalline wax that is particularly suitable in the present formulation is available under the Victory White trade name from the Petrolite Corporation.

The montan wax component for wax release layer 16 is a coal (lignite) derived wax characterized by high concentration of montanic acid ($C_{28}H_{56}O_2$). Montan wax has been determined to be a very suitable additive to increase the hardness of wax release layer 16, as well as its lubricity. Additionally, montan wax promotes a smooth glossy texture of the wax release layer 16 after transfer. Montan wax also prevents penetration of the wax release layer 16 into the paper carrier, as its forms a formation of a hard protective barrier coating over the transferred ink layer 18.

A particularly suitable type of montan wax is an oxidized, esterified, partially saponified montan wax as disclosed in U.S. Pat. No. 3,616,015, herein incorporated by reference. Montan waxes of this type have melting points (drop points) typically between about 50° F.-110° F., saponification values between about 25 and 150, acid values between about 5 and 40, and penetrometer hardness (ASTM-D5-52) below about 15 as measured with 100 grams for 5 seconds at 25° F. These montan waxes also have relatively high melt viscosity. An illustrative oxidized, esterified, partially saponified montan wax is available under the trade name Hoechst OP or Hoechst X55 modified montan wax from the Hoechst Chemical Company, Frankfurt, Germany. Hoechst OP modified montan wax has a drop point (ASTM D127) of 212° F.-221° F., a congealing point (ASTM D938-49) between 165° F.-175° F., an acid number of 10 to 15, and a saponification number of 100 to 115. Hoechst X55 has a drop point of 208° F.-218° F., a congealing point of 167° F.-176° F., an acid number of 10 to 15, and a saponification number of 90 to 110. These waxes have melt viscosities of at least about 150 centipoise at a temperature of about 25° F. above their solidification point.

Referring to FIGS. 2 and 3, the laminate 10 may further include an ink layer 18. In one embodiment, as shown in FIG. 2, the expandable layer may be adjacent said ink layer 18 such that the expandable layer contacts and confronts substantially the entire ink layer 18. In such a configuration, as the heat-activatable expandable layer 12 expands, it raises and "textures" the graphics provided by the ink layer 18. Alternatively, the expandable layer may be adjacent the ink layer 18 such that the expandable layer intercalates around the ink layer 18 (see FIG. 3). In this configuration, the heat-activatable expandable layer 12 is raised around the graphics provided by the ink layer 18. Thus, the thermally expandable layer can be coextensive with the laminate 10 or may be interspersed. In its interspersed form, the expandable layer may surround the graphics such that the ink layer 18 is recessed relative to the textured surface. Furthermore, the expandable layer may be deposited in a pattern or design, providing increased aesthetic qualities.

The ink design layer may be composed of conventional formulation known in the art for use in heat transferable laminates of this type. For example, the ink design layer may be composed of any conventional ink of any color. The ink may typically include resinous binder base compatible with the ink pigment employed. The ink binder may be selected from a wide variety of conventional resinous bases such as polyvinyl chloride, acrylics, polyamides and nitrocellulose. The ink is applied also by a gravure coating methods or the like and then passed through several convective ovens for 3 to 5 seconds in order to dry off solvents and leave a dried ink design layer over the dried lacquer coating transfer layer. In one specific embodiment, the ink layer 18 may include various materials including, but not limited to, polyamide. Examples of polyamide inks suitable for the present invention may be found in U.S. Pat. Nos. 2,862,832, 2,989,413, 2,990,311, and 3,043,732, the disclosures of which are incorporated herein in their entireties. Also polyester inks would be suitable for glass articles. Examples of such polyester inks may be found in U.S. Pat. No. 6,042,676, the disclosure of which is incorporated by reference herein in its entirety.

The ink layer 18 provides graphics or other decoration to the label of the laminate 10. However, as described briefly above, in certain embodiments (as shown in FIG. 1, for example), the laminate 10 does not include an ink layer 18, but rather may include an expandable layer. For example, the expandable layer of the laminate 10 may be in the form of a pattern or design. Thus, the expandable layer itself, when activated, provides a "watermark"-like decoration. This can obviate the use of an ink layer 18 in the laminate 10.

The laminate 10 of the present invention may further include a protective layer 20. For example, the protective layer 20 may be disposed between the wax release layer 16 and the ink layer 18, as shown in FIGS. 2 and 3. The protective layer 20 may include various materials including, but not limited to, polyester. This protective layer 20 provides protection to the ink graphics apart from any protection provided by a wax release layer 16.

As described above, the heat-activatable expandable layer 12 may be used to impart a tactile feature to the laminate 10. This tactile feature is substantially similar to a second tactile feature of a surface of an article 22 to which the laminate 10 is applied. The laminate 10 of the present invention may include at least one additional layer (such as, but not limited to, an adhesive layer 14, wax release layer 16, ink layer 18, or protective layer 20, as described above), wherein the expandable layer and the one additional layer provide a label such as, but not limited to, a heat-transferable label, an in-mold label, and a shrink sleeve label.

To form one exemplary embodiment, the wax release layer 16 is coated preferably by roller or gravure onto carrier in any desired size and pattern, thus forming a release layer. When coating with the preferred gravure technique, the thickness is conveniently adjusted by use of proper gravure cylinders. The thickness of coated release layer is preferably less than about 0.001 inch. Other coating techniques such as cast coating, particularly reverse roller coating, letterpress, and flexographic techniques, may be employed.

After coating release layer onto carrier, the coating quickly becomes solidified upon exposure to a water-cooled roller. Upon solidification of release layer, an ink design layer may be applied over this layer typically using the same coating technique previously employed.

The ink design layer is preferably applied so that release layer extends beyond the design layer. The ink design layer may be composed of any conventional ink of any color. The ink may typically include resinous binder bases compatible with the ink pigment employed. The ink binder may be selected from a wide variety of conventional resinous bases such as polyamide, polyvinyl chloride, acrylics, and polyamide nitrocellulose.

It is advantageous to overlay ink layer 18 with an adhesive coating that facilitates transfer of substrate to the article 22 to be decorated. In this case, substrate therefore may include release layer, ink design layer, heat activatable expandable layer, and adhesive layer 14 as illustrated in FIGS. 2 and 3. Adhesive layer 14 may suitably be composed of a thermoplastic polyamide adhesive. A preferred thermoplastic polyamide adhesive is the reaction product of a diamine with a dimerized fatty acid such as that available under the trade name VERSAMID 900 series from Henkel Corporation of Minneapolis, Minn. It has been found advantageous to combine this polyamide constituent with a nitrocellulose base in adhesive layer 14.

Figure 4:
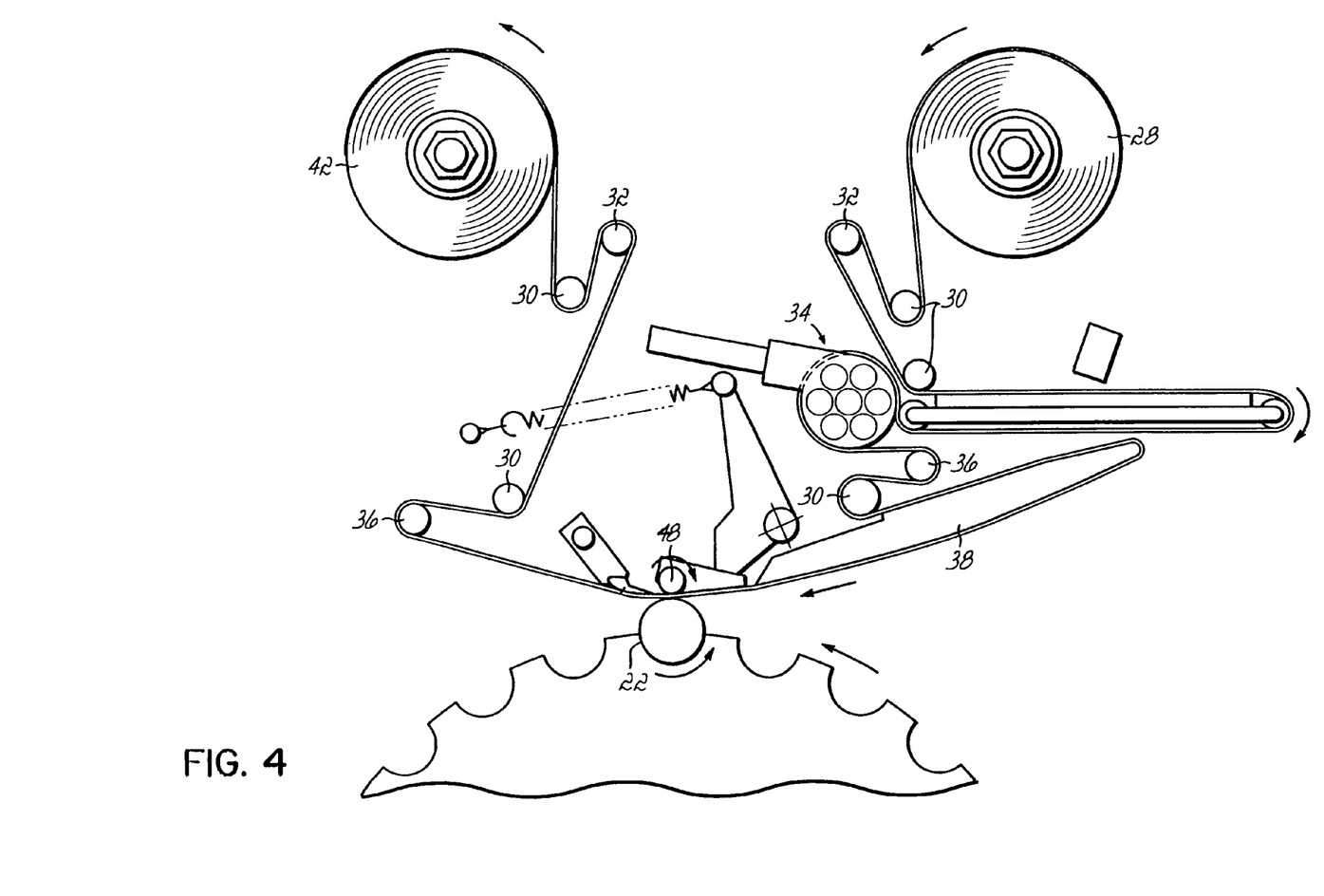
FIG. 4 is a schematic of the progression of the web/label for applying labels to articles in accordance with the principles of the present invention.

In use, and referring now to FIG. 4, the laminate 10 of the present invention is applied to an article 22 as follows. In general, the laminates 10, forming labels of the present invention, are carried on a carrier web 24. The labels are releasable from the web 24 and the web progresses from a feed reel 28 to a transfer roll 48. After being taken from a rotating feed reel 28, the carrier web 24 generally will pass through a series of idler rolls 30, dancer rolls 32, metering rolls 34, and shuttle rolls 36 before passing across the transfer roll 48 of a decorator station, which is proximal to the articles 22 being labeled. It will be recognized by those of skill in the art that the various rolls listed above are merely exemplary, and are not necessary to the principles of the present invention. Prior to reaching the transfer roll 48, the temperature of the carrier web 24, and thus the laminate 10, may be increased by moving the carrier web in proximity to a label preheater 38. The increased temperature provided by the label preheater may serve to facilitate a slight melting of the wax layer, and thus release of the laminate 10 from the web 24. The increased temperature may simultaneously further activate the adhesive layer 14 on the laminate to facilitate adherence of the laminate 10 to the article 22. Each transfer roll 48 contacts the side of the web opposite the laminate 10 and is rotatable as the web 24 is drawn across the transfer roll 48, and the laminate 10 contacts an article 22. Each decorating station and/or transfer roll can be individually moved outwardly in a direction toward the article 22 to be labeled by means of a fixed cam, or by other means, to confront and press the web and laminate against the article 22 being labeled at the required time. After the laminate has been applied to an article 22, the now empty carrier web 24 may progress again through a series of idler, dancer, and shuttle rolls 30, 32, 36 to a take-up reel 42. Again, it will be recognized by those skilled in the art that the particular number, type, and configuration of components described above are merely illustrative.

More specifically, in use, carrier web is heated to a temperature typically from about 375° F.-400° F., i.e., sufficient to melt the wax release layer 16. This may be conveniently accomplished by conveying laminate 10 over a hot platen for a period sufficient to melt release coating. Alternatively the article 22 to which laminate 10 is to be applied may be preheated to a temperature sufficiently high to melt release layer as laminate 10 is pressed against the article 22.

Laminate 10 is applied to the article 22 to be decorated by pressing the heated laminate 10 onto the article 22 so that the topmost layer of transfer substrate, for example ink design layer or optional layer contacts the article 22. Rolling pressure is applied over the exposed surface of carrier to effect transfer of substrate onto the article 22. Thereupon, carrier is peeled from substrate while wax release layer 16 is in molten state, leaving substrate permanently affixed to the article 22 with design image clearly visible through transferred release layer. Upon exposure to ambient conditions for a short period, release coating solidifies to a clear, smooth glossy protective layer 20 over transferred ink design image.

The clarity of the coating over design image at this point in the process is distinctly greater than the clarity of the transferred release layer at the same point in the process as described in U.S. Pat. No. 3,616,015. Transferred substrate may optionally be exposed to postflaming to re-melt transferred coating and thus further improve the clarity and gloss of transferred coating, and consequently, clarity of transferred design image. Postflaming may be accomplished, for example, by exposing the transferred substrate including transferred coating to jets of hot gas either as direct gas flame or as hot air jets, typically at about 300° F.-400° F. or higher for a period sufficient to melt the wax in the manner described in U.S. Pat. No. 3,616,015. Upon exposure to ambient atmosphere coating re-solidifies to a film of such high degree of clarity and transparency that hazing or halo effects are virtually undetectable by the unaided eye. The clarity of transferred coating and design image is such that the heat transferable substrate herein described may be used to decorate virtually any plastic or glass article 22. For example, the substrate is well suited to the decoration of such materials as polyvinyl chloride, polyethylene terephthalate, polyethylene, and polypropylene.

The foregoing is considered as illustrative only of the principles of the invention. Further, various modifications may be made of the invention without departing from the scope thereof, and it is desired, therefore, that only such limitations shall be placed thereon as are imposed by the prior art and which are set forth in the appended claims.

What is claimed is:

1. A label comprising:
    a plurality of layers, said plurality of layers including
    a heat-activatable expandable layer having a first surface and a second surface, said second surface being opposite said first surface, wherein said expandable layer includes a composition comprising a binder resin and a solvent, and wherein said binder resin is present in a range of about 50% (wt.) to about 80% (wt.) of said expandable layer, and said solvent is present in a range of up to about 20% (wt.) of said expandable layer;
    an adhesive layer, said adhesive layer being separate and distinct from said heat-activatable expandable layer, and said adhesive layer being disposed in direct contact with said first surface of said heat-activatable expandable layer; and
    an ink layer having a first surface and a second surface, said first surface of said ink layer being disposed proximal to said second surface of said heat-activatable expandable layer such that said heat-activatable expandable layer is positioned between said ink layer and said adhesive layer; and
    wherein said second surface of said ink layer is:
        (a) the outermost surface of the label, when the label is applied to an article; or
        (b) in direct contact with a wax layer, the wax layer being the outermost surface of the label when the label is applied to an article; or
        (c) in direct contact with a protective lacquer layer.

2. The label of claim 1, wherein said adhesive layer is a heat transfer adhesive layer.

3. The label of claim 2, wherein said composition further comprises a colorant.

4. The label of claim 3, wherein said colorant is present in a range of about 1% (wt.) to about 5% (wt.) of said expandable layer.

5. The label of claim 3, wherein the colorant is chosen from a nonionic water-based pigment dye and an anionic dye.

6. The label of claim 2, wherein said composition is associated with a plurality of microspheres.

7. The label of claim 6, wherein said microspheres are present in a range of about 10% (wt.) to about 50% (wt.) of said expandable layer.

8. The label of claim 6, wherein said microspheres include a volatilizable hydrocarbon.

9. The label of claim 6, wherein said microspheres encapsulate a gas.

10. The label of claim 9, wherein said gas is isobutane.

11. The label of claim 6, wherein said composition is disposed on an outer surface of said microspheres.

12. The label of claim 6, wherein said microspheres are heat-rupturable.

13. The label of claim 12, wherein said microspheres are adapted to rupture at temperatures at or above 180° F.

14. The label of claim 2, wherein said binder resin is chosen from acrylic binders, vinyl acrylic copolymer binders, vinyl acetate homopolymer binders, styrene acrylic binders, and phenoxy binders.

15. The label of claim 2, wherein the solvent is chosen from distilled water and isopropanol.

16. The label of claim 1, further comprising a wax release layer.

17. The label of claim 16, wherein said expandable layer is disposed between said adhesive layer and said wax release layer.

18. The label of claim 17, wherein said wax release layer is in contact with said expandable layer.

19. The label of claim 16, wherein the wax release layer includes material selected from paraffin, montan wax, and microcrystalline wax.

20. The label of claim 16, wherein said expandable layer is adjacent said ink layer such that said ink layer is in contact with said expandable layer.

21. The label of claim 16, wherein said expandable layer is adjacent said ink layer such that said expandable layer intercalates around said ink layer.

22. The label of claim 16, wherein said expandable layer is disposed between said ink layer and said adhesive layer.

23. The label of claim 16, wherein said ink layer includes material selected from polyamides and polyesters.

24. The label of claim 16, further comprising a protective layer.

25. The label of claim 24, wherein said protective layer is disposed between said wax release layer and said ink layer.

26. The label of claim 24, wherein said protective layer includes polyester.

27. The label of claim 1, further comprising a protective layer.

28. The label of claim 1, wherein said adhesive layer is adapted to contact an article to which the label is to be applied.

29. The label of claim 1, wherein the adhesive layer includes a polyamide.

30. The label of claim 1, wherein said tactile feature imparted by said expandable layer is substantially similar to a second tactile feature of a surface of an article to which the label is applied.

31. The label of claim 1, wherein the expandable layer is in the form of a pattern or design to provide a graphic, text, or other decoration that is less than the surface area of the label.

32. The label of claim 1, wherein said heat-activatable expandable layer, when in a heat-activated state, provides at least a tactile feature.

* * * * *

UNITED STATES PATENT AND TRADEMARK OFFICE
CERTIFICATE OF CORRECTION

PATENT NO.         : 8,932,706 B2
APPLICATION NO.    : 11/260528
DATED              : January 13, 2015
INVENTOR(S)        : Jean-Paul Laprade et al.

It is certified that error appears in the above-identified patent and that said Letters Patent is hereby corrected as shown below:

In the Specification

Column 7,
Line 21 reads "drop melting point)." and should read -- drop melting point.) --.

Signed and Sealed this
Twenty-third Day of June, 2015

Michelle K. Lee
*Director of the United States Patent and Trademark Office*